United States Patent [19]
Hufnagel

[11] 3,937,509
[45] Feb. 10, 1976

[54] ANIMAL FECES COLLECTING DEVICE
[75] Inventor: Frank W. Hufnagel, Pompano Beach, Fla.
[73] Assignee: Lawrence Peska Associates, Inc., New York, N.Y. ; a part interest
[22] Filed: Oct. 15, 1974
[21] Appl. No.: 514,636

[52] U.S. Cl................ 294/1 R; 15/257.6; 15/257.7; 294/19 R; 294/55
[51] Int. Cl.².................. A10K 23/00; A01K 29/00
[58] Field of Search............ 294/1 R, 19 R, 21, 22, 294/50.8, 50.9, 55, 57, 104, 115; 15/104.8, 257.1, 257.6, 257.7; 56/328 R; 119/1, 95

[56] References Cited
UNITED STATES PATENTS

| | | | |
|---|---|---|---|
| 953,756 | 4/1910 | Olson | 15/257.6 |
| 1,160,282 | 11/1915 | Harris et al. | 294/50.9 X |
| 2,309,948 | 2/1943 | Goebel | 294/19 R X |
| 3,136,573 | 6/1964 | Harke | 294/19 A |
| 3,139,299 | 6/1964 | Bowen | 294/55 |
| 3,431,008 | 3/1969 | Narita | 294/55 |
| 3,804,448 | 4/1974 | Schmieler | 294/19 R |
| 3,827,098 | 8/1974 | Sanderson | 294/1 R X |

*Primary Examiner*—Evon C. Blunk
*Assistant Examiner*—Johnny D. Cherry

[57] ABSTRACT

An animal feces collecting device is used to scoop up animal feces from the ground or catch the feces as it is falling from the animal. The animal feces device comprises an open top cylinder shaped container having a communicating disposable plastic bag. A telescoping handle assembly is affixed to a longitudinal sidewall of the cylinder shaped container. A circular shaped disc top cover is hingeably mounted to the open end of the cylinder shaped container.

2 Claims, 4 Drawing Figures

U.S. Patent  Feb. 10, 1976  3,937,509
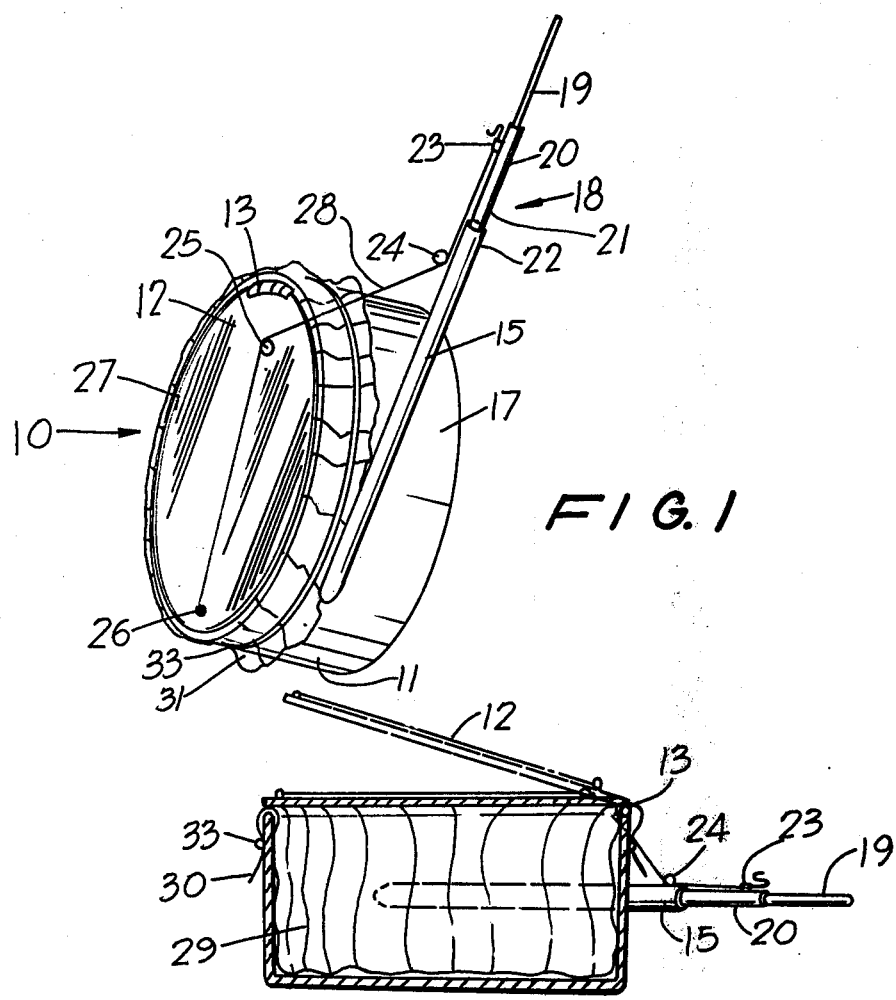
FIG. 1
FIG. 2
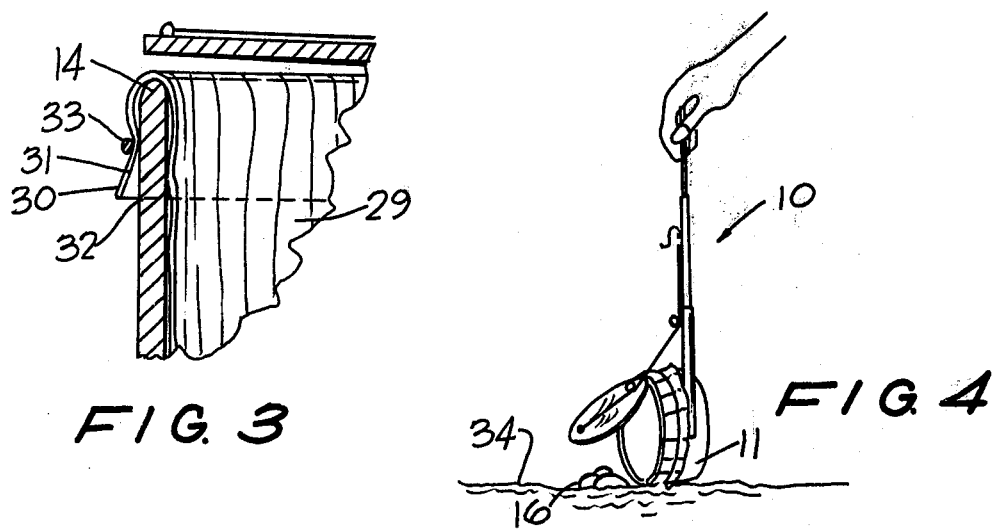
FIG. 3
FIG. 4

ANIMAL FECES COLLECTING DEVICE

SUMMARY OF THE INVENTION

My present invention relates to a unique and novel device for scooping up animal feces from the ground.

It is known from U.S. Pat. Nos. 3,431,008; 3,659,891; 3,757,737; and 3,792,687 that collecting devices have been employed but these aforementioned patents are of complicated design involving paddle assemblies for knocking the feces into a container, or a harness device affixing to the animal, unnecessarily complicated handle assemblies, or they fail to provide a method to seal the collecting unit.

It is an object of my present invention to provide a collecting unit having a communicating disposable plastic bag.

Another object of my present invention is to provide a means of sealing the collecting unit, when the collecting unit is not in use.

A further object of my present invention is to provide a means of controlling the sealing means via the handle assembly.

A still further object of my present invention is to provide a means of vertical height adjustment of the vertically held handle assembly.

Yet another object of my present invention is to provide a means whereby the animal feces can be caught while the animal is defecating.

An advantage of my invention is that it provides an animal feces collecting device of uncomplicated design and low manufacturing cost.

Briefly, my invention comprises an animal feces collecting device is used to scoop up animal feces from the ground. The animal feces device comprises an open top cylinder shaped container having a communicating disposable plastic bag. A telescoping hand assembly is affixed to a longitudinal sidewall of the cylinder shaped container. A circular shaped disc top cover is hingeably mounted to the open end of the cylinder shaped container. A means is provided for opening and closing the disc top cover.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a side perspective view of the invention;

FIG. 2 illustrates a side cross sectional view of the invention;

FIG. 3 illustrates a side cross sectional view of the bag mounting mechanism of the invention; and FIG. 4 illustrates a perspective view of the invention in use.

DESCRIPTION OF THE PREFERRED EMBODIMENT

Turning now descriptively to the drawings, in which similar reference characters denote similar elements throughout the several views, FIG. 4 shows an animal feces collecting device 10 used to scoop up animal feces 16 from the ground as well as catch the animal feces, while the animal is defecating. FIGS. 1–2 show the animal feces collecting device 10 which comprises an open top cylinder shaped container 11 used as the scooping means. A flat circular disc top cover 12 is hingeably 13 mounted to the open end top circular edge 14 of the container 11. A hollow tube 15 is tangentially mounted onto an outside longitudinal sidewall 17 of the container 11, wherein the hollow tube 15 is perpendicular to the longitudinal height of the container 11. The handle assembly 18 of the animal feces collecting device 10 comprises a handle section 19 telescopically communicating with a tube engaging section 20, wherein the free end 21 of section 20 is slidably mounted into a second free end 22 of tube 15. A first 23 and second 24 aligned eyehooks are mounted onto section 20 and tube 15. A third 25 and fourth 26 aligned eyehooks are mounted onto opposite sides of the top surface 27 of top cover 12. A string 28 is tied to the fourth eyehook 26, threaded through the third eyehook 25 on top cover 12, threaded through the second eyehook 24 on hollow tube 15, and tied to the first eyehook 23 on section 20. As the handle assembly 18 is slid back and forth within tube 15, tension is applied and released from the string 28 causing the top cover 12 to open and close on the top circular edge 14 of container 11. The closed end of a plastic bag 29 is inserted into container 11, wherein the open end 30 of the plastic bag 29 is folded back over edge 14 of container 11 forming an outer cuff 31 on the top longitudinal periphery 32 of container 11 as shown in FIG. 3. An elastic band 33 is placed onto the cuff 31 of the bag 29 holding the bag 29 within the container 11. Referring back to FIG. 4, as the handle assembly 18 is held in a vertical plane, the container 11 with bag 29 engages the ground 34 so that the container 11 can be used to scoop up the animal feces 16 from the ground 34. The cover 12 is closed after scooping so that the feces 16 can be transportated in container 11.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An animal feces collecting device adapted to scoop animal feces from the ground, which comprises:
   a. a cylindrically shaped container having an open top end and an outside longitudinal surface;
   b. a hollow tube affixed tangentially to said outside longitudinal surface;
   c. a tube engaging section slidably mounted into said hollow tube;
   d. a handle section telescopically communicating with said tube engaging section;
   e. a flat circular disc top cover hingably mounted to an open top end of said container;
   f. a first eye hook affixed to said tube engaging section;
   g. a second eye hook affixed to said hollow tube;
   h. Third and fourth aligned eye hooks affixed to a top surface of said cover;
   g. a string tied to said fourth eye hook, threaded through said second and third eye hooks, and tied to said first eye hook, said tube engaging section sliding back and forth within said hollow tube causing said cover to open and close upon said container.

2. An animal feces collecting device as recited in claim 1, which further comprises:
 a. an open end plastic bag inserted into said open end of said cylinder shaped container;
 b. said open end of said plastic bag folded back over said open end of said cylinder shaped container forming a cuff along a top longitudinal periphery of said cylinder shaped container; and
 c. an elastic band engaging said cuff of said plastic bag.

* * * * *